Oct. 24, 1939.   W. A. PURTELL   2,177,005
LOCKING SCREW
Filed Dec. 30, 1937
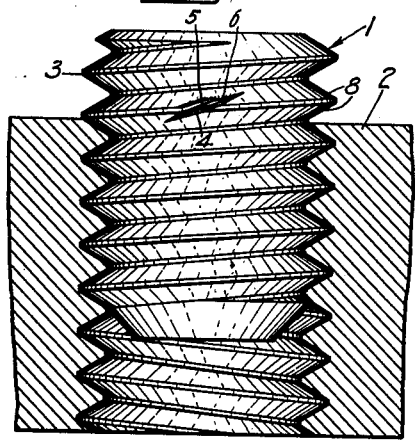
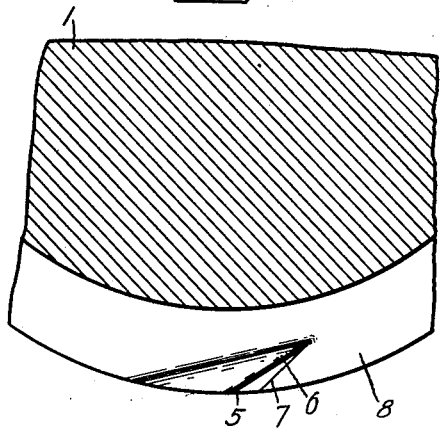
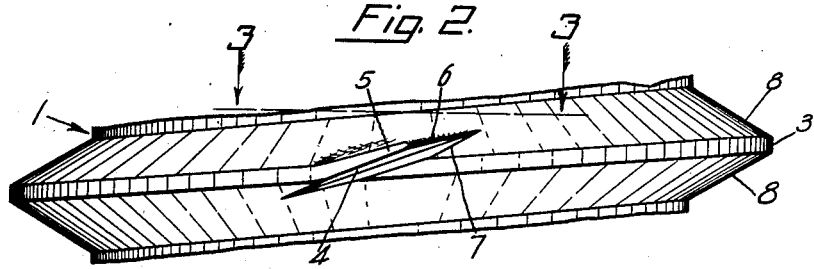
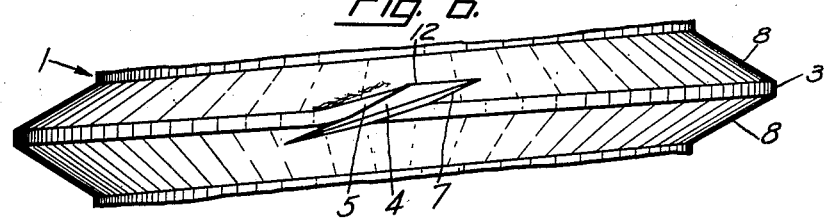
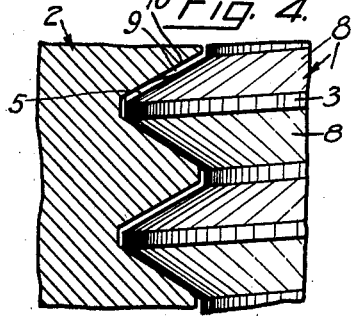
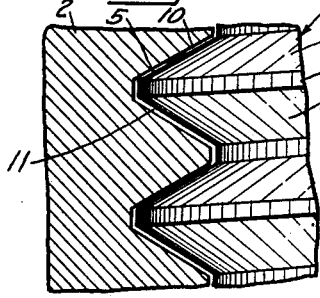
INVENTOR
William A. Purtell
By
ATTORNEY Patented Oct. 24, 1939

2,177,005

UNITED STATES PATENT OFFICE 2,177,005

LOCKING SCREW

William A. Purtell, West Hartford, Conn.

Application December 30, 1937, Serial No. 182,555

7 Claims. (Cl. 151—22)

My invention relates to locking screws.

It has for its object to provide an improved and simplified screw, and, more particularly, an improved and simplified self locking screw. A further object of my invention is to provide improved locking means for such a screw including improved resilient means formed in the thread thereof, whereby, while no substantial resistance is offered to the threading-in of the screw, loosening of the latter is effectually prevented. A still further object of my invention is to provide such an improved locking screw of a markedly improved and exceedingly simple construction, which, while adapted to be provided on the screws without appreciably increasing the cost thereof, is very effective in operation. These and other objects and advantages of my improved construction will, however, hereinafter more fully appear.

In the accompanying drawing, I have shown for purposes of illustration two forms which my invention may assume in practice.

In the drawing—

Figure 1 is a side view of a set screw embodying the features of my invention, the screw being shown partly threaded into a companion member illustrated in section;

Fig. 2 is an enlarged detail view of the portion of the screw thread carrying my improved locking means;

Fig. 3 is a sectional view on line 3—3 of Figure 2, showing said means in plan;

Fig. 4 is a detail sectional view showing the relation of the threads and locking means during the process of insertion of the screw;

Fig. 5 is a view similar to Figure 4 but showing the position of the parts after resistance is encountered by the screw, and Fig. 6 is a view similar to Figure 2, showing a modified construction.

In the construction shown in Figures 1 to 5, I have shown a socketed set screw 1 threaded into a companion member 2, the screw 1 being equipped with my improved locking means hereinafter more fully described.

Referring to Figure 2, it will be noted that the standard crest 3 of the thread, preferably near the upper end of the screw 1, is slit or slotted angularly between normal portions of the crest, as shown at 4, this slit terminating short of the base of the thread which remains wholly undeformed. Herein, the slit or slot extends from the right diagonally downwardly to the left at a slight angle in such manner as to form an upwardly deflected portion or lip 5 which lies within the peripheral limit of the thread crest.

As shown, this lip 5 has an angularly disposed portion of the crest 3 forming a side edge thereof and tapering toward an angularly disposed trailing edge 6 spaced apart from and angularly disposed relative to a lower edge 7 formed in the upper side face 8 of the thread. Further, it will be noted that the slit or slot 4, the upper edges of which are formed by the edges 6 and 7 just described, not only extends diagonally downward and to the left from these edges and under the deflected portion 5 of the crest, but herein to a point somewhat beyond and below the junction of the lip 5 with the portion of the crest 3, at the left of the lip 5, while cutting the portion of the crest 3 at the right of the slit or slot 4 preferably without displacing the same downwardly. Thus, the upper side face 8 of the thread has an upwardly turned resilient lip 5 thereon trailing upwardly away from the direction of insertion of the screw. It will further be noted that the trailing edge 6 of this lip is rounded.

As a result of this construction, when the screw 1 is threaded into the companion member 2, it will be observed that the lip 5 thus produced, being so formed as to be resilient, will move quite freely in the clearance space 9 presented in the upper side face 8 when the screw is being inserted. More particularly, it will yield during threading in, as the upper surface of this lip engages the upper side surface 10 of the female thread, in such manner as to be forced backward and downward toward the slit or slot 4, in such manner as thereby to minimize resistance while the screw is being threaded in. When, however, the screw 1 encounters resistance, as for example, when it bottoms in the hole, it will be evident that the clearance 9 above the thread will then disappear, while a clearance 11 will be presented below the thread in a usual manner. When this occurs, the lip 5, since it will not be wholly depressed into the slot or slit 4, will press tightly against the upper side face 10 of the female thread, in such manner as very effectually to resist angular movement of the screw 1 and thus effectually to prevent loosening the same. Further, it will be evident that if the screw 1 is rotated reversely, the resiliency of the lip and the rounded edge 6 thereof, will be such as, while preventing loosening of the screw in the hole, to permit reverse rotation of the screw without objectionable digging into the side faces 10 of the female thread. In other words, the resilient lip 5 not only functions to facilitate threading in, and also retain the screw against loosening after encountering resistance, while in the latter instance also acting to cause the threads on the members 1 and 2 to bind very effectively; but the lip structure, due to its resiliency and the rounded edge 6, is also such as to enable the digging of the resilient lip to be somewhat relieved upon manual rotation of the screw 1 in a reverse direction in such manner as to facilitate removal when desired, while also minimizing marring or objectionable scarring of the female thread. As a result of having the locking lip located wholly in the more resilient crest of the thread of an otherwise normal screw thread, undesirable deformation of the companion thread is avoided, as the more resilient lip engages the stronger root, or base, portion of the companion thread which can successfully resist deformation. This locking lip also being wholly within the limits of the peripheral crest, it can be turned off or onto its companion thread repeatedly without deforming the companion thread and while continuing to perform its locking functions. Here, attention is also directed to the fact that my improved construction is such as to be adapted to be provided on the thread with a minimum of expense. Further, it will be noted that it may be applied to any screw and readily and inexpensively applied thereto after the completion of the manufacture of the screw.

While not preferred, I have illustrated in Figure 6 a modified construction which may be used if desired. This construction is generally similar to that previously described, save that it will be noted that, instead of a rounded edge 6 such as heretofore described, a sharp edge 12 is provided as a trailing edge on the lip. This construction will obviously dig deeply into the side faces of the female thread upon reversal of the screw and is, accordingly, not preferred for ordinary use, although it will be evident that in certain uses, where, for example, mutilation of the female thread is of no moment, or where it is not desired to remove the screw, this construction is well adapted to use.

While I have in this application specifically described two embodiments which my invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. A preformed self locking screw including a locking turn of thread having an undeformed base and having in an intermediate portion of its crest and between normal crest portions thereof a resilient trailing lip disposed within the peripheral limit of said thread and projecting angularly therefrom between the periphery and the base of said thread.

2. A preformed self locking screw including a locking turn of thread having an undeformed base and having in an intermediate portion of its crest and between normal crest portions thereof a resilient trailing lip disposed within the peripheral limit of said thread and projecting angularly therefrom between the periphery of said thread and said base and also having an angularly disposed lip receiving aperture beneath said lip extending across said crest and terminating short of said base.

3. A preformed self locking screw having a locking turn of thread having an undeformed base and having between normal crest portions thereof a resilient trailing lip overlying the upper side face of said thread depressible into the clearance between said upper side face of said thread and the adjacent lower side face of a companion female thread during threading in of the screw and resiliently engaging said lower side face when the screw encounters resistance to resist reverse rotation of said screw.

4. A preformed self locking screw including a locking turn of thread having a base free from offsets in profile and having a thread crest and having in an intermediate portion of its crest and between normal crest portions thereof a trailing lip projecting upwardly and angularly therefrom within the peripheral limit of said crest, said lip including a deflected portion of said crest and having a rounded trailing edge.

5. A preformed self locking screw including a locking turn of thread having a base free from offsets in profile and having a thread crest and having in an intermediate portion of its crest and between normal crest portions thereof a trailing lip projecting upwardly and angularly therefrom within the peripheral limits of said crest, said lip including a deflected portion of said crest having a sharp trailing edge.

6. A preformed self locking screw including a locking turn of thread having a base free from offsets in profile and having a thread crest and having in an intermediate portion of its crest and between normal crest portions thereof a trailing lip projecting upwardly and angularly therefrom within the peripheral limit of said crest, said lip comprising an upwardly and angularly deflected resilient portion of the crest having a trailing edge movable with said resilient portion toward and from said crest.

7. A preformed self locking screw having a locking turn of thread having a continuous base free from offsets in profile and having a thread crest and having in an intermediate portion of its crest and between normal crest portions thereof a trailing lip projecting upwardly and angularly therefrom, said lip comprising an upwardly and angularly deflected resilient portion of the crest having a trailing edge movable with said resilient portion toward and from said crest, and said crest having an angular slot therein extending under said lip and beyond said trailing edge into the upper side face of the thread and providing clearance for said resilient portion beneath the latter.

WILLIAM A. PURTELL.